United States Patent [19]

Jang et al.

[11] Patent Number: 5,548,546
[45] Date of Patent: Aug. 20, 1996

[54] HIGH-SPEED CARRY INCREMENT ADDING DEVICE

[75] Inventors: Hyun S. Jang; Chul D. Oh, both of Bubaleub, Rep. of Korea

[73] Assignee: Hyundai Electronics Industries, Co., Ltd., Rep. of Korea

[21] Appl. No.: 547,427

[22] Filed: Oct. 24, 1995

Related U.S. Application Data

[63] Continuation of Ser. No. 228,107, Apr. 15, 1994, abandoned.

[30] Foreign Application Priority Data

Apr. 16, 1993 [KR] Rep. of Korea ............... 1993-6461

[51] Int. Cl.⁶ ...................................................... G06F 7/50
[52] U.S. Cl. ................................................................ 364/786
[58] Field of Search ..................................... 364/784, 786

[56] References Cited

U.S. PATENT DOCUMENTS

| | | | |
|---|---|---|---|
| 4,425,623 | 1/1984 | Russell | 364/786 |
| 4,802,112 | 1/1989 | Yoshida et al. | 364/784 |
| 4,845,655 | 7/1989 | Yamada et al. | 364/786 |
| 5,146,424 | 9/1992 | Peterson et al. | 364/786 |

*Primary Examiner*—Tan V. Mai
*Attorney, Agent, or Firm*—Merchant, Gould, Smith, Edell, Welter & Schmidt

[57] ABSTRACT

A high-speed carry increment adding device having a first module including a first adder, the first adder adding a desired number of first bit inputs and generating a plurality of partitioned sums and a partitioned carry as a result of the addition, and a second module including a second adder and a conditional incrementer, the second adder adding a desired number of second bit inputs regardless of the partitioned carry from the first adder and generating a plurality of partitioned sums and a partitioned carry as a result of the addition, the conditional incrementer inputting the partitioned carry from the first adder as an increment signal and incrementing the partitioned sums from the second adder in response to the inputted increment signal. Also, the second module includes a partitioned sum detector for detecting whether all of the partitioned sums from the second adder are "1" and generating a partitioned sum detect signal in accordance with the detected result. Also, the adding device includes at least one module arranged at a stage subsequent to and in parallel to the second module, the at least one module having the same construction as that of the second module, and an increment signal generator for generating the increment signal to the conditional incrementer of a desired one of the modules.

4 Claims, 8 Drawing Sheets

HIGH-SPEED CARRY INCREMENT ADDING DEVICE

This is a File Wrapper Continuation application of application Ser. No. 08/228,107, filed Apr. 15, 1994.

BACKGROUND OF THE INVENTION

1. Field of the Invention

The present invention relates to a high-speed carry increment adding device for digital devices.

2. Description of the Prior Art

Generally, an adding device is a basic block of an arithmetic logic unit and is required to have a high-speed processing capability because it is an important factor of determining a performance of such a digital device.

As conventional adding devices, there have been proposed a carry lookaffead adding device, a carry skip adding device and a carry select adding device, which has a performance faster than the others in view of a construction except an improvement in circuitry.

Figure 1:
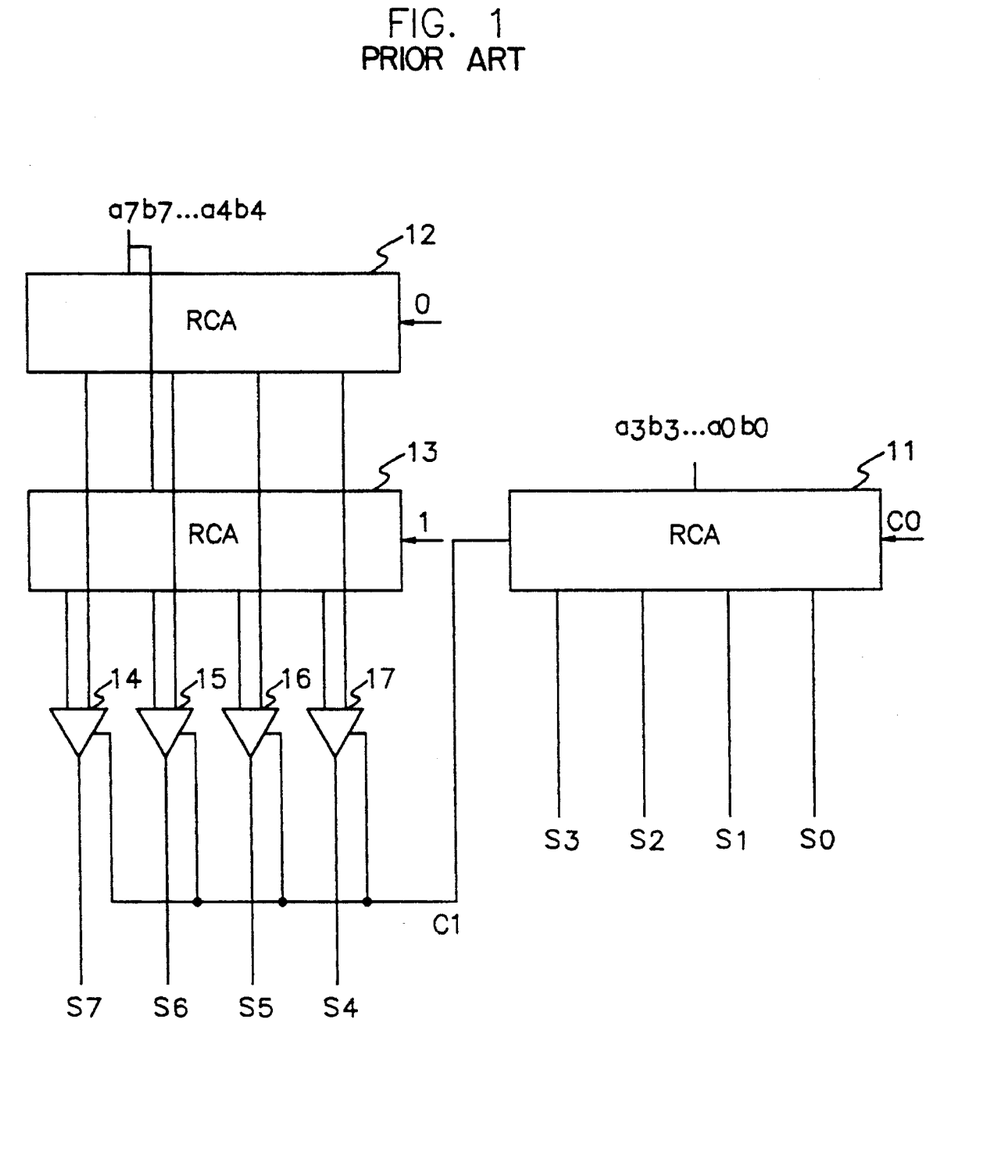
FIG. 1 is a block diagram of a conventional carry select adding device which performs 8-bit addition.

Referring to FIG. 1, there is shown a block diagram of a conventional carry select adding device which performs 8-bit addition. As shown in this drawing, the conventional carry select adding device comprises three ripple carry adders (referred to hereinafter as RCAs) 11–13 and data selectors 14–17. The RCAs 11–13 are partitioned adders, each of which generates a plurality of partitioned sums and a partitioned carry in the unit of module of a given number of bits. Here, the partitioned adders receive 4 bit inputs to be added in the unit of module.

The RCA 11 of the first module receives 4 bit inputs a0b0–a3b3 and generates partitioned sums S0–S3 and a partitioned carry C1. Without waiting for generation of a "1" or "0" carry in the RCA 11 of the low-order module, the RCAs 12 and 13 of the high-order module add 4 bit inputs a4b4–a7b7 simultaneously.

Namely, the RCA 12 of the high-order module previously adds the 4 bit inputs a4b4–a7b7 with respect to the case where the partitioned carry 01 from the RCA 11 of the low-order module is "0". At the same time, the RCA 13 of the high-order module previously adds the 4 bit inputs a4b4–a767 with respect to the case where the partitioned carry C1 from the RCA 11 of the low-order module is "1". Then, each of the data selectors 14–17 selects one of corresponding ones of the partitioned sums from the RCAs 12 and 13 in response to the partitioned carry C1 from the RCA 11 to output a corresponding one of partitioned sums S4–S7. In this manner, the 8-bit addition is performed.

The total delay time of the adding device in FIG. 1 is the sum of a delay time of the RCA 11 of the low-order module and a delay time for which the outputs from the RCAs 12 and 13 of the high-order module are multiplexed in response to the partitioned carry C1 from the RCA 11.

Figure 2:
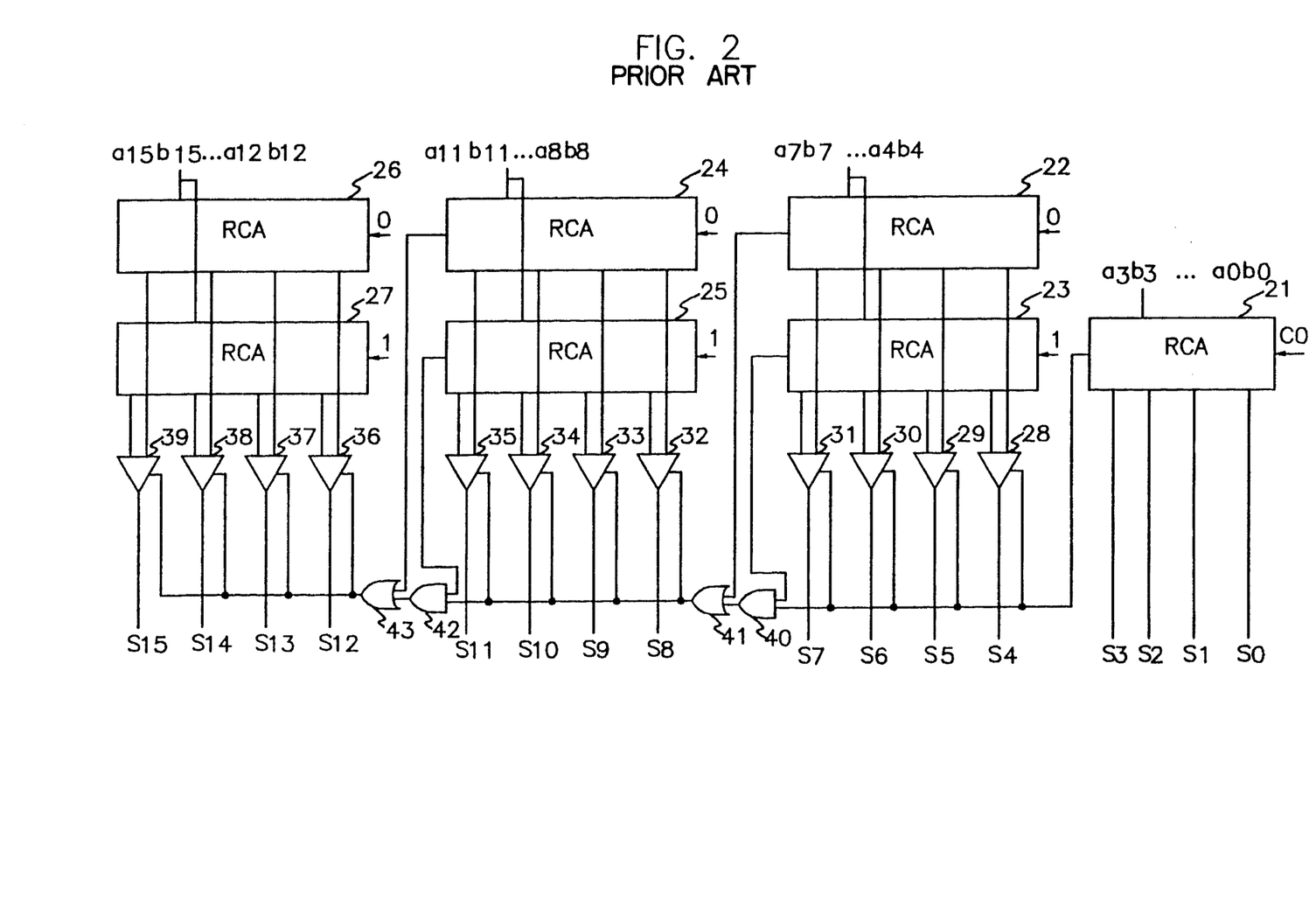
FIG. 2 is a block diagram of a conventional carry select adding device which performs 16-bit addition.

Referring to FIG. 2, there is shown a block diagram of a conventional carry select adding device Which performs 16-bit addition. As shown in this drawing, the conventional carry select adding device comprises RCAs 21–27 and data 28–39 in the same manner as that in FIG. 1. Also, the carry select adding device comprises AND gates 40 and 42 and OR gates 41 and 43 which provide select signals to the data selectors 32–39 of the subsequent modules in response to generated carries.

The total delay time of the adding device in FIG. 2 is the sum of a delay time of the RCA 21 of the lowest-order module and a multiplexing time of the RCAs 22–27 of the higher-order modules. In this connection, the carry select adding device can perform he addition operation at a very high speed.

In other words, the conventional carry select adding device transfers the carries by modularizing a given number of bits or a useful bit length, to make up for a drawback in the carry transfer by bits. As a result, the conventional carry select adding device has the high-speed processing capability.

However, the conventional carry select adding device has a disadvantage in that the carries being successively transferred in the unit of module are subjected to a restriction resulting from the multiplexing loads. Also, two RCAs are required in the unit of module, resulting in an increase i n an area of the adding device. Further, the carries are rippled in the unit of module. This results in a reduction in the operation speed as the bits to be processed are increased in number. For this reason, a dual verification is typically required in an existing floating point arithmetic. Also, the addition operation cannot be performed at the high speed with respect to the large number of bits such as, for example, 64 bits. In other words, in the case where the bits to be added are large in number, an improvement in the operation speed is accompanied with an increase in the design time and cost although it is enabled by a technique in circuitry or a manufacturing process,

SUMMARY OF THE INVENTION

Therefore, the present invention has been made in view of the above problems, and it is an object of the present invention to provide a high-speed carry increment adding device with an improved structure which increases an operation speed regardless of a design manner.

In accordance with the present invention, the above and other objects can be accomplished by a provision of a high-speed carry increment adding device comprising a first module including first adding means, said first adding means adding a desired number of first bit inputs and generating a plurality of partitioned sums and a partitioned carry as a result of the addition; and a second module including second adding means and conditional incrementing means, said second adding means adding a desired number of second bit inputs regardless of the partitioned carry from said first adding means and generating a plurality of partitioned sums and a partitioned carry as a result of the addition, said conditional incrementing means inputting the partitioned carry from said first adding means as an increment signal and incrementing the partitioned sums from said second adding means in response to the inputted increment signal.

Also, in accordance with the present invention, the second module further includes partitioned sum detection means for detecting whether all of the partitioned sums from said second adding means are "1" and generating a partitioned sum detect signal in accordance with the detected result.

Moreover, in accordance with the present invention, the high-speed carry increment adding device further comprises at least one module arranged at a stage subsequent to and in parallel to said second module, said at least one module having the same construction as that of said second module; and increment signal generation means for applying the partitioned carry from said first adding means of said first module as the increment signal to said conditional incrementing means of said second module when the partitioned carry is generated from said first adding means and, when the partitioned carry is generated from a lower-order one of said second module and said at least one module, ANDing the partitioned carry from said lower-order module and the partitioned sum detect signals which are generated from said partitioned sum detection means from a module subsequent to said lower-order module to a given module and applying the increment signal to said conditional incrementing means of a module subsequent to said given module if the ANDed result is "1".

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
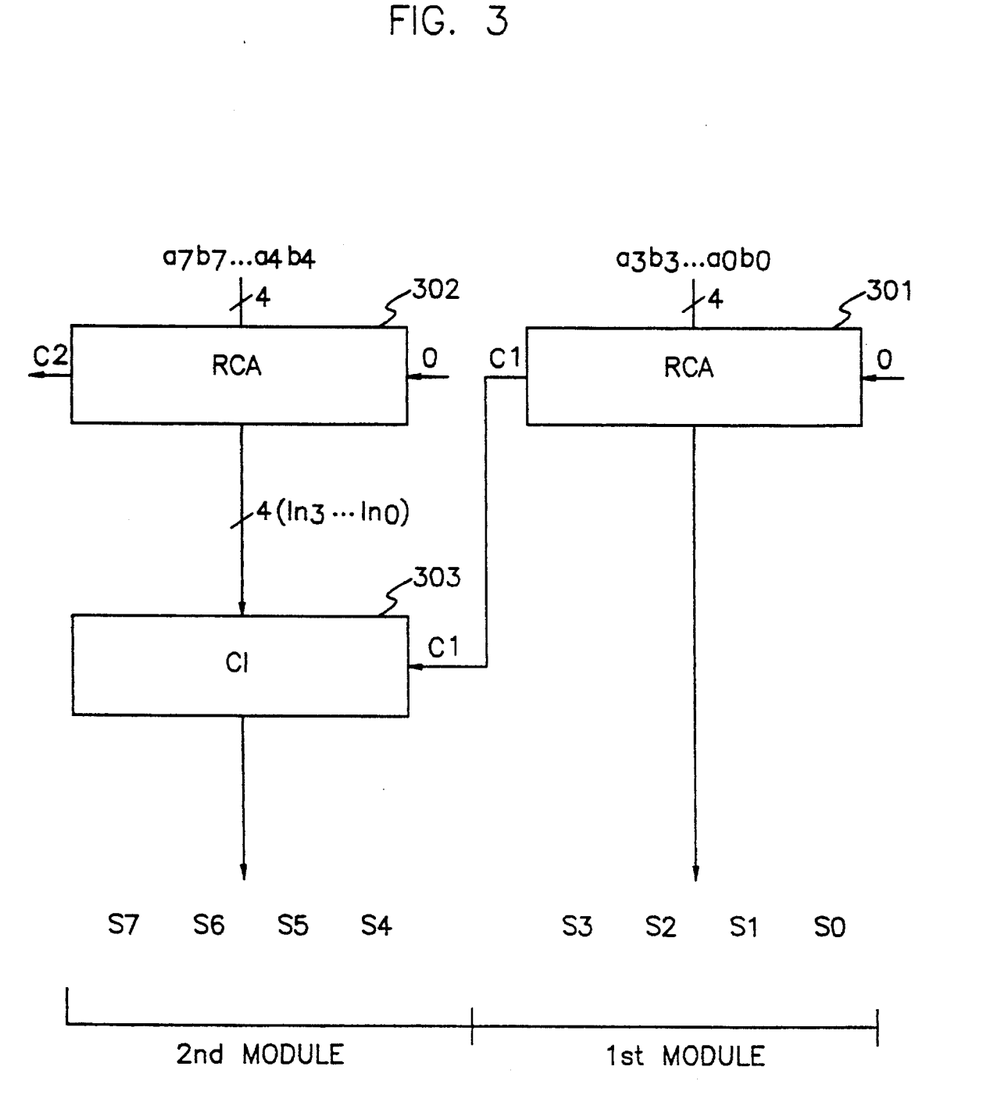
FIG. 3 is a block diagram of a carry increment adding device which performs 8-bit addition in accordance with a first embodiment of the present invention.

Referring to FIG. 3, there is shown a block diagram of a carry increment adding (CIA) device which performs 8-bit addition in accordance with a first embodiment of the present invention. As shown in this drawing, the carry increment adding device comprises two modules to perform the 8-bit addition.

The low-order module includes a RCA 301 with partitioned input terminals for receiving 4 bit inputs a0b0–a3b3. The high-order module includes a RCA 302 with partitioned input terminals for receiving 4 bit inputs a4b4–a7b7 and a conditional incrementer CI 303. Noticeably, the conditional incrementer 303 is N–1 in number in the case where the carry increment adding device has N modules.

In operation, the RCA 301 of the low-order module adds the 4 bit inputs a0b0–a3b3 and generates partitioned sums S0–S3 and a partitioned carry C1 as a result of the addition. The RCA 302 of the high-order module adds the 4 bit inputs a4b4–a767 regardless of the partitioned carry C1 from the RCA 301 of the low-order module and generated partitioned sums IN0–IN3 and a partitioned carry C2 as a result of the addition. The partitioned sums IN0–IN3 from the RCA 302 of the high-order module are applied to the conditional incrementer 303 thereof. When the partitioned carry C1 from the RCA 301 of the low-order module is "1", the conditional incrementer 33 increments the partitioned sums IN0–IN3 from the RCA 302 of the high-order module and outputs the incremented sums as partitioned sums S4–S7.

On the contrary, if the partitioned carry C1 from the RCA 301 of the low-order module is "0", the conditional incrementer 303 outputs the partitioned sums IN0–IN3 from the RCA 302 of the high-order module directly as the partitioned sums S4–S7.

Figure 4:
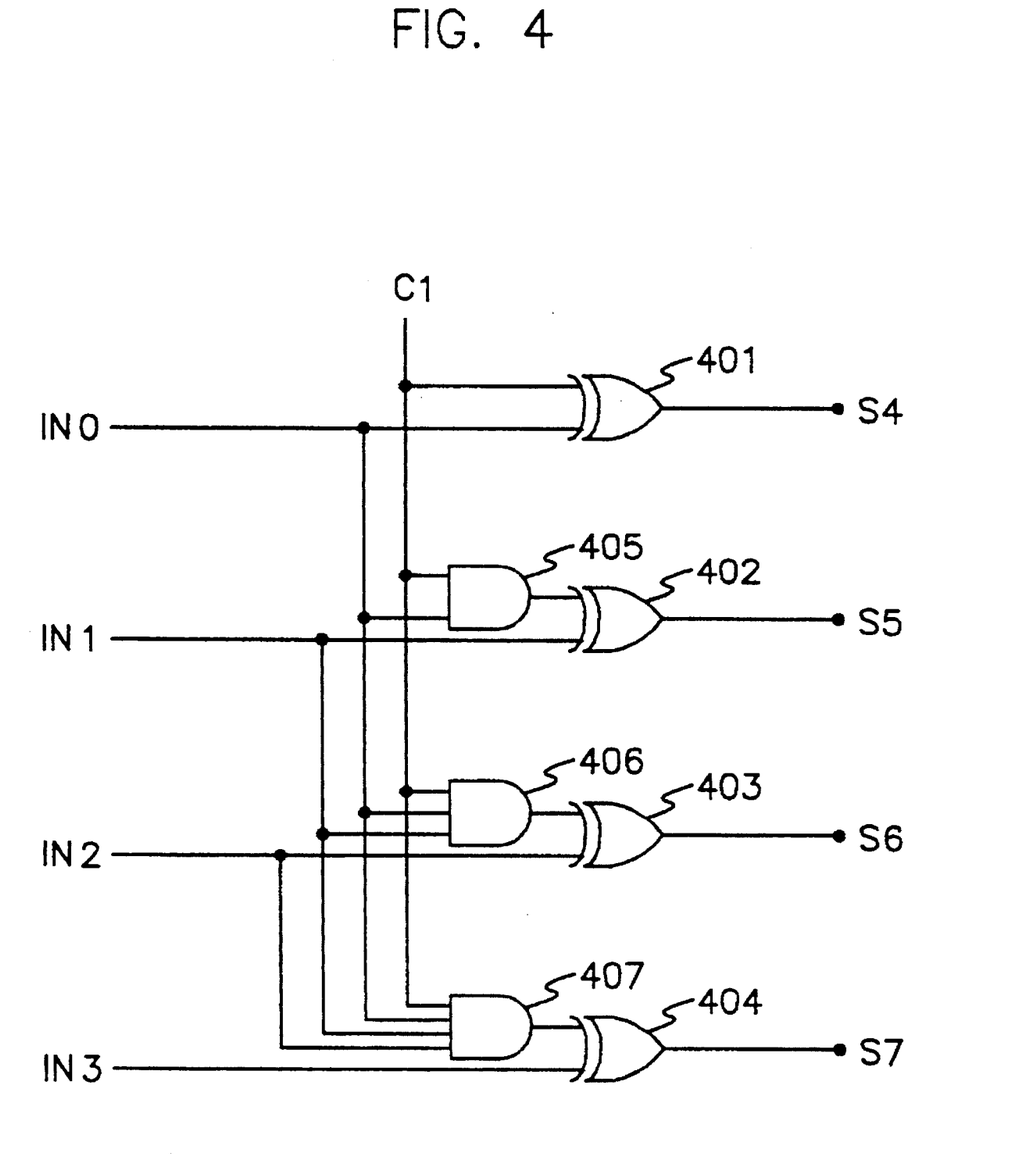
FIG. 4 is a detailed circuit diagram of a conditional incrementer in FIG. 3.

Referring to FIG. 4, there is shown a detailed circuit diagram of the conditional incrementer 303 in FIG. 3. As shown in this drawing, the conditional incrementer 303 has 4 input stages for inputting the partitioned sums IN0–IN3 from the RCA 302 of the high-order module and 4 output stages for out, putting the partitioned sums S4–S7. The conditional incrementer 303 is adapted to input the partitioned carry C1 from the RCA 301 of the low-order module and the partitioned sums IN0–IN3 from the RCA 302 of the high-order module and generate the partitioned sums S4–S7.

In detail, the conditional incrementer 303 includes an XOR gate 401 for exclusive-ORing the partitioned sum IN0 of a least significant bit from the RCA 302 of the high-order module and the partitioned carry C1 from the RCA 301 of the low-order module to generate the partitioned sum S4, an AND gate 405 for ANDing the partitioned sum IN0 of the east significant bit from the RCA 302 of the high-order module and the partitioned carry C1 from the RCA 301 of the low-order module, an XOR gate 402 for exclusive-ORing the partitioned sum IN1 from the RCA 302 of the high-order module and an output from the AND gate 405 to generate the partitioned sum S5, an AND gate 406 for ANDing the partitioned carry C1 from the RCA 301 of the low-order module and the partitioned sums IN0 and IN1 from the RCA 302 of the high-order module, an XOR gate 403 for exclusive-ORing the partitioned sum IN2 from the RCA 302 of the high-order module and an output from the AND gate 406 to generate the partitioned sum S6, an AND gate 407 for ANDing the partitioned carry C1 from the RCA 301 of the low-order module and the partitioned sums IN0, IN1 and IN2 from the RCA 302 of the high-order module, and an XOR gate 404 for exclusive-ORing the partitioned sum IN3 of a most significant bit from the RCA 302 of the high-order module and an output from the AND gate 407 to generate the partitioned sum S7.

Namely, the first one of the partitioned sums from the conditional incrementer 303 is produced by exclusive-ORing the partitioned carry C1 from the RCA 301 and the partitioned sum of the least significant bit from the RCA 302 and each of the others is produced by ANDing the partitioned carry C1 from the RCA 301 and the partitioned sums of the lower-order bits from the RCA 302 and exclusive-ORing the ANDed result and the partitioned sum of a corresponding bit from the RCA 302. For example, in the case where the partitioned carry 01 from the RCA 301 is "1" and the partitioned sums IN3, IN2, IN1 and IN0 from the RCA 302 are 1011, the partitioned sums S7, S6, S5 and S4 from the conditional incrementer 303 are 1100.

As shown in FIG. 4, the logic elements are connected in parallel to perform a high-speed increment function.

Figure 5:
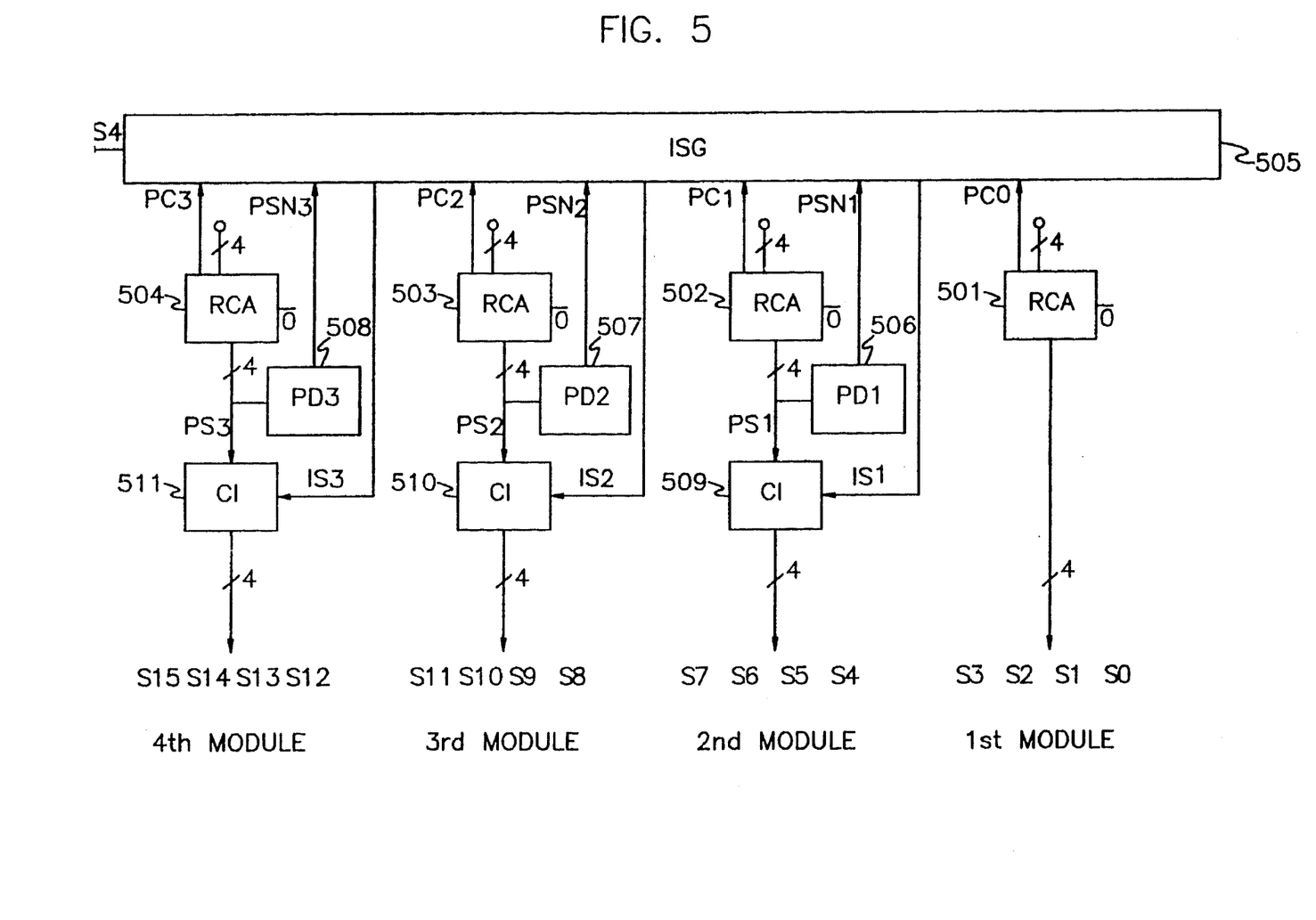
FIG. 5 is a block diagram of a carry increment adding device which performs 10-bit addition in accordance with a second embodiment of the present invention.

Referring to FIG. 5, there is shown a block diagram of a carry increment adding device which performs 16-bit addition in accordance with a second embodiment of the present invention. As shown in this drawing, the carry increment adding device comprises four modules to perform the 16-bit addition.

In the second embodiment of the present invention, the carry increment adding device comprises 4-bit RCAs 501–504 and three conditional incrementers 509–511, The carry increment adding device also comprises three partitioned sum detectors 506–508, each of which detects whether all of partitioned sums from a corresponding one of the RCAs 502–504 are "1" and outputs a corresponding one of partitioned sum detect signals PSN1–PSN3. Also, the carry increment adding device comprises an increment signal generator 505 for generating increment signals IS1–IS3 to the conditional incrementers 509–511 in response to carries PC0–PC3 from the RCAs 501–504 and the partitioned sum detect signals PSN1–PSN3 from the partitioned sum detectors 506–508.

Namely, when all of the partitioned sums from a certain one of the RCAs 501–504 are "1", they are incremented by the corresponding conditional incrementer, resulting in generation of a carry. To prevent it, the partitioned sum detector is provided to detect whether all of the partitioned sums from the corresponding RCA are "1" and output the corresponding partitioned sum detect signal to the increment signal generator 505. As a result, in response to the partitioned sum detect signal from the partitioned sum detector and the carry from the RCA of the present module, the increment signal generator 505 generates the increment signal to the conditional incrementer of the next module. The detailed description will be mentioned later with reference to FIG. 6.

In operation, the RCA 501 of the lowest-order module adds the partitioned 4 bit inputs and generates the partitioned sums S0–S3 and the partitioned carry PC0 as a result of the addition. The partitioned carry PC0 from the RCA 501 of the lowest-order module is applied to the increment signal generator 505.

The RCAs 502–504 of the higher-order modules add the partitioned 4 bit inputs and generate the partitioned sums and the partitioned carries PC1–PC3 as a result of the addition, respectively. The partitioned sums from the RCAs 502–504 of the higher-order modules are applied to the corresponding conditional incrementers 509–511, respectively. Also, the partitioned carries PC1–PC3 from the RCAs 502–504 are applied to the increment signal generator 505. When all of the partitioned sums from a certain one of the RCAs 501–504 are "1", the corresponding partitioned sum detector outputs the partitioned sum detect signal to the increment signal generator 505. Here, it should be noted that the partitioned sum detect signal and the partitioned carry of the same module cannot simultaneously become "1". In other words, all of the partitioned sums cannot be "1" under the condition that the partitioned carry is generated in the same module.

The RCAs receive input carries of "0", respectively, and perform the addition operation in a parallel processing manner, resulting in an enhancement in the operation speed. Also, a 1 bit half-adder may be used to calculate the least significant bit in each module. The use of the half-adder has the effect of improving the operation speed and the area of the adding device. Further, a random number of bits such as, for example, 3 bits or 5 bits may be processed in the unit of module, or different useful bit lengths may be processed every module. Moreover, the modules may be implemented by any adders other than the RCAs.

Figure 6:
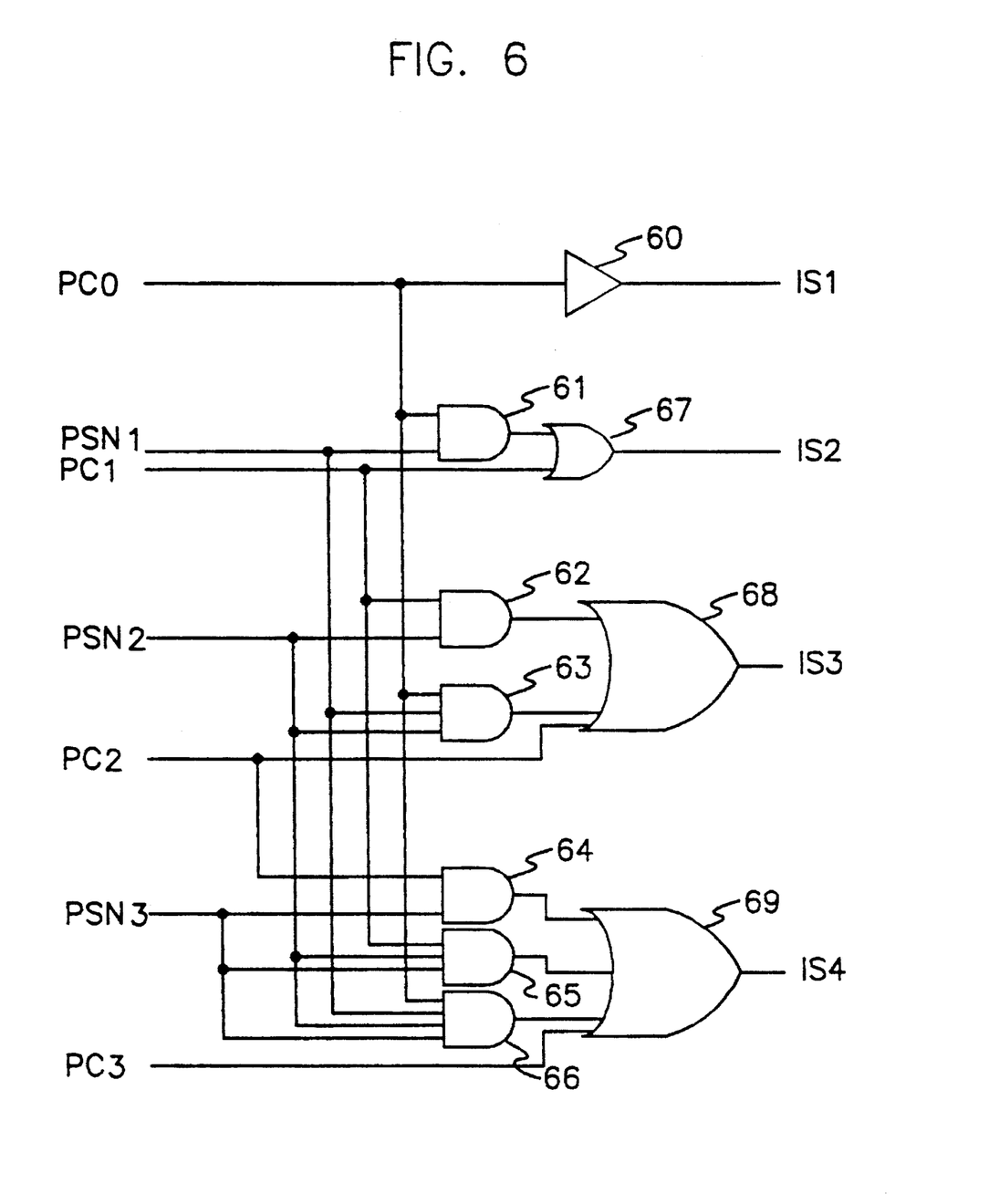
FIG. 6 is a detailed circuit diagram of an increment signal generator i n FIG. 5.

Referring to FIG. 6, there is shown a detailed circuit diagram of the increment signal generator 505 in FIG. 5. As shown in this drawing, the increment signals IS1–IS3 from the increment signal generator 505 become "1" in the case where the partitioned carries are generated from all the modules.

A buffer 60 is provided in the increment signal generator 505 for buffering the partitioned carry PC0 from the first module to generate the increment signal IS1 to the conditional incrementer 509 of the second module. In response to the increment signal IS1 from the buffer 60, the conditional incrementer 509 increments the partitioned sums PS1 from the RCA 502 and outputs the incremented sums as the partitioned sums S4–S7.

An AND gate 61 is also provided in the increment signal generator 505 for ANDing the partitioned carry PC0 from the first module and the partitioned sum detect signal PSN1 from the second module. An OR gate 67 is adapted to OR the partitioned carry PC1 from the second module and an output from the AND gate 61 to generate the increment signal IS2 to the conditional incrementer 510 of the third module. In response to the increment signal IS2 from the OR gate 67, the conditional incrementer 510 increments the partitioned sums PS2 from the RCA 503 and outputs the incremented sums as the partitioned sums S8–S11.

Similarly, the increment signals to the subsequent modules will be generated according to the following rule. Namely, the increment signal is produced by ANDing the partitioned carry from a certain one of the lower-order modules and the partitioned sum detect signals which are generated from the partitioned sum detectors from the module subsequent to the above-mentioned lower module to the present module and ORing the ANDed result and the partitioned carry from the present module. The produced increment signal is applied to the conditional incrementer of the module subsequent to the present module.

Figure 7:
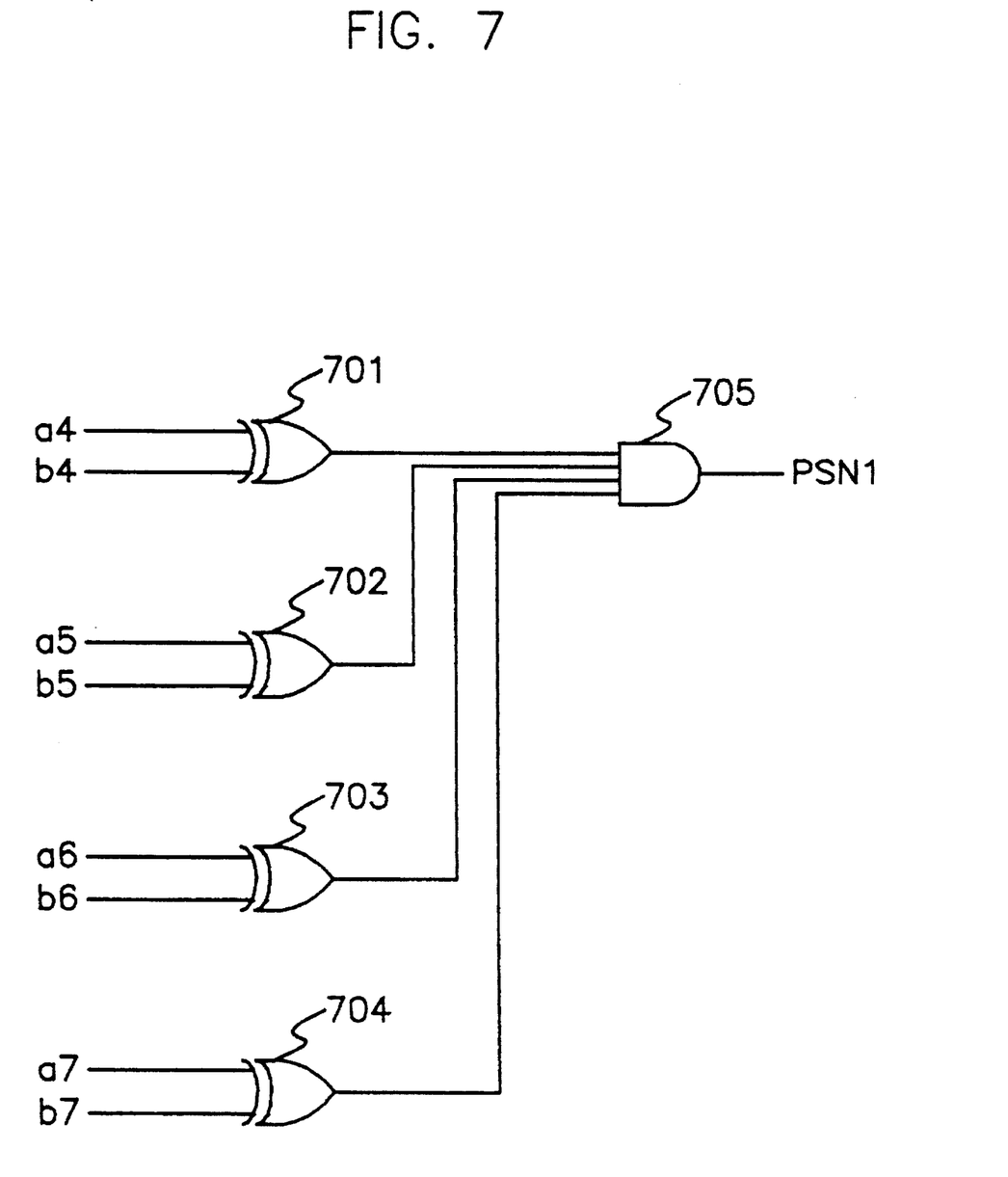
FIG. 7 is a detailed circuit diagram of a partitioned sum detector in FIG. 5.

Referring to FIG. 7, there s shown a detailed circuit diagram of each of the partitioned sum detectors 506–508 n FIG. 5. As shown in this drawing, each partitioned sum detector includes XOR gates 701–704 and a 4-input AND gate 705. In practice, only the 4-input AND gate may be required because the XOR gate is contained n the adder of each module.

The total delay time of the adding device in FIG. 5 is the sum of a parallel addition time of the modules or a delay time of the 4-bit RCAs, a delay time of about two of the gates in the increment signal generator and a delay time of the AND and XOR gates in the conditional incrementers. Therefore, the increment signals can nearly simultaneously be generated. This has the effect of avoiding an increase in the delay due to the carry ripple by modules in the conventional carry select adding device.

Figure 8:
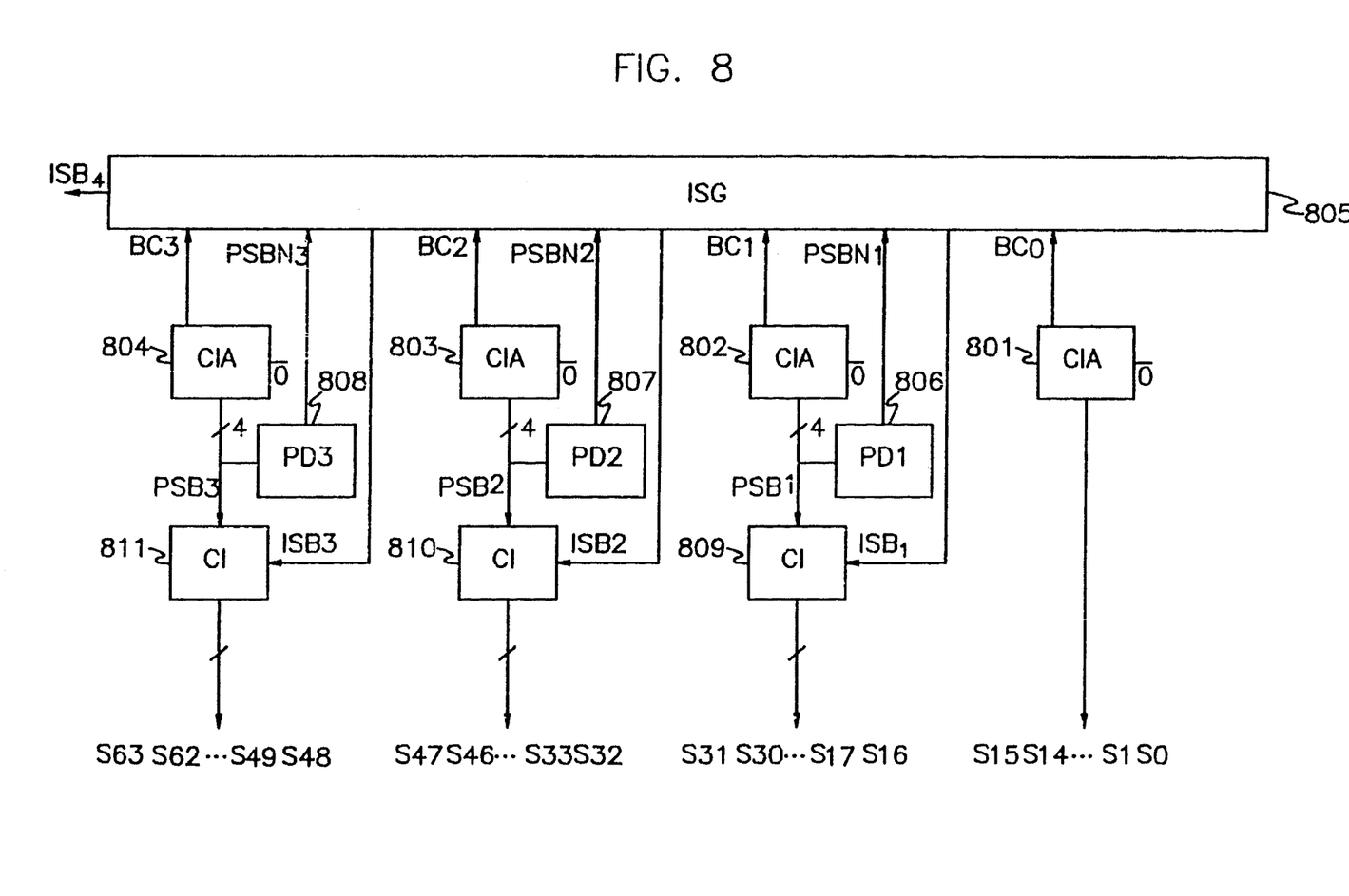
FIG. 8 is a block diagram of a carry increment adding device which performs 64-bit addition in accordance with a third embodiment of the present invention.

Referring to FIG. 8, there is shown a block diagram of a carry increment adding device which performs 64-bit addition in accordance with a third embodiment of the present invention. In this embodiment, 16-bit CIAs are provided instead of the RCAs in the second embodiment in FIG. 5. In FIG. 8, the reference numerals 801–804 designate 16-bit CIA, 805 increment signal generator, 806–808 partitioned sum detectors, 809–811 conditional incrementers, BC0–BC3 partitioned carries, ISB1–ISB4 increment signals, PSB1–PSB3 partitioned sums, and PSBN1–PSBN3 partitioned sum detect signals, respectively. In the same manner as that of the second embodiment in FIG. 5, the partitioned carries BC0–BC3 by stages are simultaneously generated and the final sums are nearly simultaneously obtained through conditional incrementers by stages.

As apparent from the above description, according to the present invention, the increment signals by modules or block stages are nearly simultaneously generated. Therefore, the operation speed of the present adding device is faster than that of any conventional adding device. Also, the gates of the present adding device are smaller in number than those of the conventional carry select, adding device, resulting in an improvement in the construction. Therefore, the present invention can be applied to any circuitry or manufacturing process. For example, the present invention can be applied to the design of devices requiring the high-speed operation, such as a standard cell, a gate array and etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-speed carry increment adding device, comprising:

a first module including first adding means, said first adding means adding a desired number of first bit inputs and generating a plurality of partitioned sums and a partitioned carry as a result of the addition;

a second module including second adding means and conditional incrementing means, said second adding means adding a desired number of second bit inputs regardless of the partitioned carry from said first adding means and generating a plurality of partitioned sums and a partitioned carry as a result of the addition, said conditional incrementing means inputting the partitioned carry from said first adding means as an increment signal and incrementing the partitioned sums from said second adding means in response to the inputted increment signal;

wherein said second module further includes:

partitioned sum detection means for detecting whether all of the partitioned sums from said second adding means are "1" and generating a partitioned sum detect signal in accordance with the detected result; and wherein said high-speed carry increment adding device further comprises:

at least one module arranged at a stage subsequent to and in parallel to said second module, said at least one module having the same construction as that of said second module; and increment signal generation means for applying the partitioned carry from said first adding means of said first module as the increment signal to said conditional incrementing means of said second module when the partitioned carry is generated from said first adding means and, when the partitioned carry is generated from lower-order one of said second module and said at least one module, ANDing the partitioned carry from said lower-order module and the partitioned sum detect signals which are generated from said partitioned sum detection means from a module subsequent to said lower-order module to a given module and applying the increment signal to said conditional incrementing means of a module subsequent to said given module if the ANDed result is "1"; and wherein said conditional incrementing means includes means for generating a first one of final partitioned sums by exclusive-ORing the increment signal and a least significant bit of the partitioned sums from said second adding means and means for generating each of the other final partitioned sums by ANDing the increment signal and lower-order bits of the partitioned sums from said second adding means and exclusive-ORing the ANDed result and a corresponding bit of the partitioned sums from said second adding means.

2. A high-speed carry increment adding device as set forth in claim 1, wherein the partitioned carry from said lower-order module and the partitioned sum detect signals are ANDed in an AND gate.

3. A high-speed carry increment adding device, comprising:

a first module including first adding means, said first adding means adding a desired number of first bit inputs and generating a plurality of partitioned sums and a partitioned carry as a result of the addition;

a second module including second adding means and conditional incrementing means, said second adding means adding a desired number of second bit inputs regardless of the partitioned carry from said first adding means and generating a plurality of partitioned sums and a partitioned carry as a result of the addition, said conditional incrementing means inputting the partitioned carry from said first adding means as an increment signal and incrementing the partitioned sums from said second adding means in response to the inputted increment signal; and wherein said conditional incrementing means includes means for generating a first one of final partitioned sums by exclusive-ORing the increment signal and a least significant bit of the partitioned sums from said second adding means and means for generating each of the other final partitioned sums by ANDing the increment signal and lower-order bits of the partitioned sums from said second adding means and exclusive-ORing the ANDed result and a corresponding bit of the partitioned sums from said second adding means.

4. A high-speed carry increment adding device as set forth in claim 3, wherein the increment signal and the lower-order bits of the partitioned sums from said second adding means are ANDed in an AND gate.

* * * * *

UNITED STATES PATENT AND TRADEMARK OFFICE
CERTIFICATE OF CORRECTION

PATENT NO. : 5,548,546

DATED : August 20, 1996

INVENTOR(S) : Jang et al.

It is certified that error appears in the above-identified patent and that said Letters Patent is hereby corrected as shown below:

In column 1, line 19, "lookaffead" should be --lookahead--.

line 41, "01" should be --C1--.

line 44, "a767" should be --a7b7--.

line 69. insert --selectors-- after the word "data".

In column 2, line 3, "he" should be --the--.

line 15, "i n" should be --in--.

In column 3, line 27, "10-bit" should be --16-bit--.

line 30, "i n" should be --in--.

line 58, "a767" should be --a7b7--.

line 59, "generated" should be --generates--.

line 65, "33" should read --303--.

UNITED STATES PATENT AND TRADEMARK OFFICE
CERTIFICATE OF CORRECTION

PATENT NO. : 5,548,546

DATED : August 20, 1996

INVENTOR(S) : Jang et al.

It is certified that error appears in the above-identified patent and that said Letters Patent is hereby corrected as shown below:

In column 4, line 11, "out,putting" should be --outputting--.

line 22, "east" should be --least--.

line 50, "01" should be --C1--.

In column 6, lines 28 and 33, "n" should be --in--.

Signed and Sealed this

Twenty-fifth Day of February, 1997

Attest:

BRUCE LEHMAN

Attesting Officer      Commissioner of Patents and Trademarks